United States Patent [19]

Finke

[11] 4,261,783

[45] Apr. 14, 1981

[54] LABEL PRINTING AND APPLYING APPARATUS

[75] Inventor: Eugene W. Finke, Miamisburg, Ohio

[73] Assignee: Monarch Marking Systems, Inc., Dayton, Ohio

[21] Appl. No.: 762,606

[22] Filed: Jan. 26, 1977

Related U.S. Application Data

[60] Continuation of Ser. No. 503,210, Sep. 9, 1974, abandoned, which is a division of Ser. No. 229,383, Feb. 25, 1972, Pat. No. 3,837,966.

[51] Int. Cl.[3] .......... B32B 35/00

[52] U.S. Cl. .......... 156/384; 29/127; 29/128; 156/488; 156/541; 156/542; 156/577; 156/579; 156/584

[58] Field of Search .......... 156/384, 468, 475, 480, 156/481, 487, 488, 493, 541, 542, 577, 579, 582, 584, DIG. 33, DIG. 37, DIG. 39, DIG. 41, DIG. 42, DIG. 48; 29/126, 127, 128

[56] References Cited

U.S. PATENT DOCUMENTS

| | | | |
|---|---|---|---|
| 1,044,190 | 11/1912 | Kohart | 156/579 |
| 2,166,497 | 7/1939 | Knoedler | 156/488 |
| 2,909,301 | 10/1959 | Fritzinger | 156/584 |
| 3,127,299 | 3/1964 | Hecht | 156/579 |
| 3,238,080 | 3/1966 | Schluter | 156/542 |
| 3,461,018 | 8/1969 | Nagashima | 156/584 |
| 3,468,739 | 9/1969 | Schrotz | 156/542 |
| 3,568,286 | 3/1971 | Ross | 29/128 |
| 3,846,221 | 11/1974 | Golec | 156/582 |

*Primary Examiner*—Caleb Weston
*Attorney, Agent, or Firm*—Joseph J. Grass

[57] ABSTRACT

There is disclosed label printing and applying apparatus comprising a platen and cooperable printing means for printing successive pressure sensitive labels, a delaminator for delaminating the printed labels successively from the associated web of supporting material, and an applicator for applying the printed delaminated labels to merchandise. The positional relationship of the delaminator relative to the platen and to the applicator can be quickly and easily varied by means of a resilient locking arrangement. Also disclosed are various embodiments of the applicator in the form of roll structure which is capable of yielding to conform to irregularities in the surface to which the label is applied.

8 Claims, 14 Drawing Figures

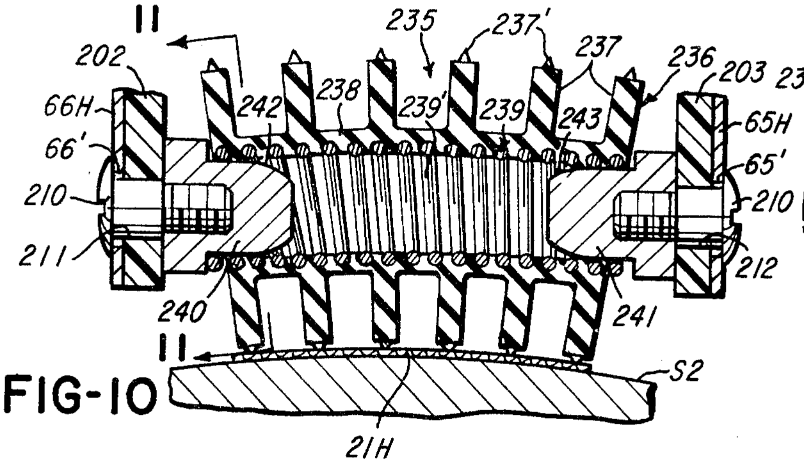
FIG-10
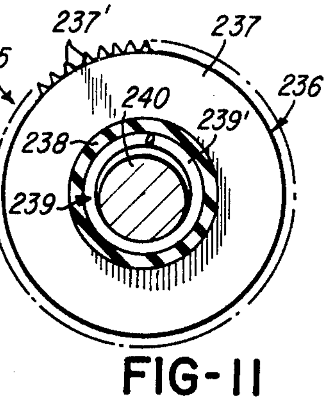
FIG-11
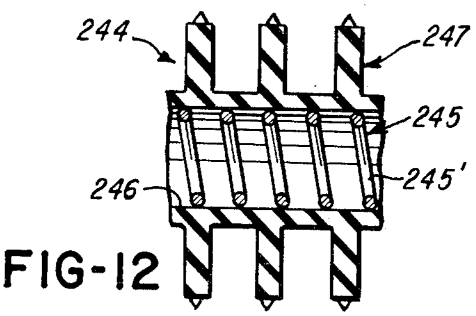
FIG-12
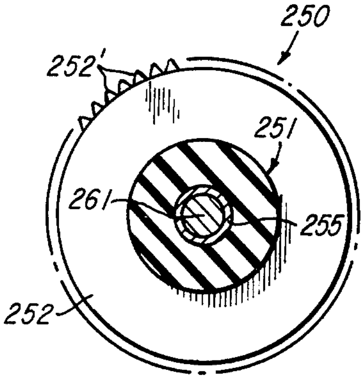
FIG-14
FIG-13
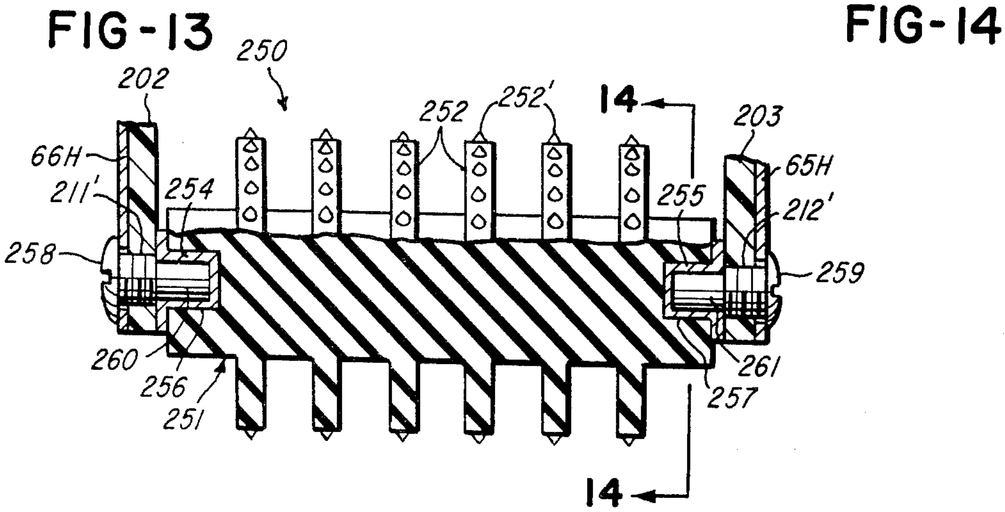

LABEL PRINTING AND APPLYING APPARATUS

CROSS-REFERENCE TO RELATED APPLICATION

This is a continuation of application Ser. No. 503,210 filed Sept. 9, 1974, now abandoned, which is a division of application Ser. No. 229,383 filed Feb. 25, 1972, now U.S. Pat No. 3,837,966.

BACKGROUND OF THE INVENTION

1. Field of the Invention

This invention relates to the art of label printing and applying apparatus.

2. Brief Description of the Prior Art

U.S. Pat No. 3,440,123 to Paul H. Hamisch, Sr. discloses one form of apparatus to which the invention can be applied; this patent discloses a platen, a print head cooperable with the platen, an applicator mounted by the platen, and a screw by which the delaminator can be secured in a selected positional relationship with respect to both the platen and the applicator. U.S. Pat. No. 3,619,324 to Yo Sato et al discloses various embodiments of roll-type applicators and U.S. Pat. No. 3,350,091 to E. E. Masterson et al discloses roll structure employing a plurality of separate discs. U.S. Pat. No. 3,238,080 of H. C. Schuter discloses an application wheel or roll having a finned surface configuration.

SUMMARY OF THE INVENTION

The present invention relates to an improvement over U.S. Pat. No. 3,440,123. The invention is shown to be applied to apparatus which dispenses a label and which both prints on successive labels and applies the labels to a desired surface such as to merchandise. However, the invention is useful in an arrangement in which labels are successively printed and dispensed without the step of applying them to any surface, and the invention is also useful in an arrangement in which labels are dispensed and applied to a surface without any printing step. The invention comprises an arrangement by which the positional relationship of a delaminator can be readily changed relative to a platen and to an applicator by use of a resiliently mounted locking member. In accordance with one specific embodiment a flexible resilient arm is connected to the platen. A toothed member preferably having two teeth is disposed at the free end of the arm. Any suitable applicator is mounted by the platen downstream of a delaminator. The delaminator is mounted by a plate downstream of the platen. The plate has a plurality of closely spaced apart teeth. The teeth on the arm are cooperable with teeth on the plate. Flexure of the arm enables the plate and the delaminator to be moved to enable the teeth on the arm to be engaged with teeth at a different position on the plate. The applicator is illustrated as being in the form of a roll which is mounted to the side edges of the platen by a pair of mounting arms. The mounting arms are flexible and resilient and have opposed guide tracks. The arms can be sprung apart to receive opposed guided members or projections which are joined integrally to the plate. The platen, the mounting arms, and the arm which carries the toothed member is of one-piece molded plastic construction and the plate and the guided members are of one-piece molded construction. Accordingly, there is provided a low-cost arrangement, an ease of assembly and features not taught in U.S. Pat. No. 3,440,123. The invention also comprises various embodiments of a roll-type applicator which is able to yield to conform to irregular surfaces as the label is applied, and yet which is simple in construction, has relatively few parts, and provides adequate frictional contract to roll over the label as it is being applied.

BRIEF DESCRIPTION OF THE DRAWINGS

FIG. 10 is a sectional view of an alternative embodiment of the applicator applying a label to a convex object;

FIG. 11 is a sectional view taken generally along line 11—11 of FIG. 10;

FIG. 12 is a fragmentary sectional view of another alternative embodiment of the applicator;

FIG. 13 is a partly sectional view of another embodiment of the applicator; and FIG. 14 is a sectional view taken along line 14—14 of FIG. 13.

DESCRIPTION OF THE PREFERRED EMBODIMENTS

Figure 1:
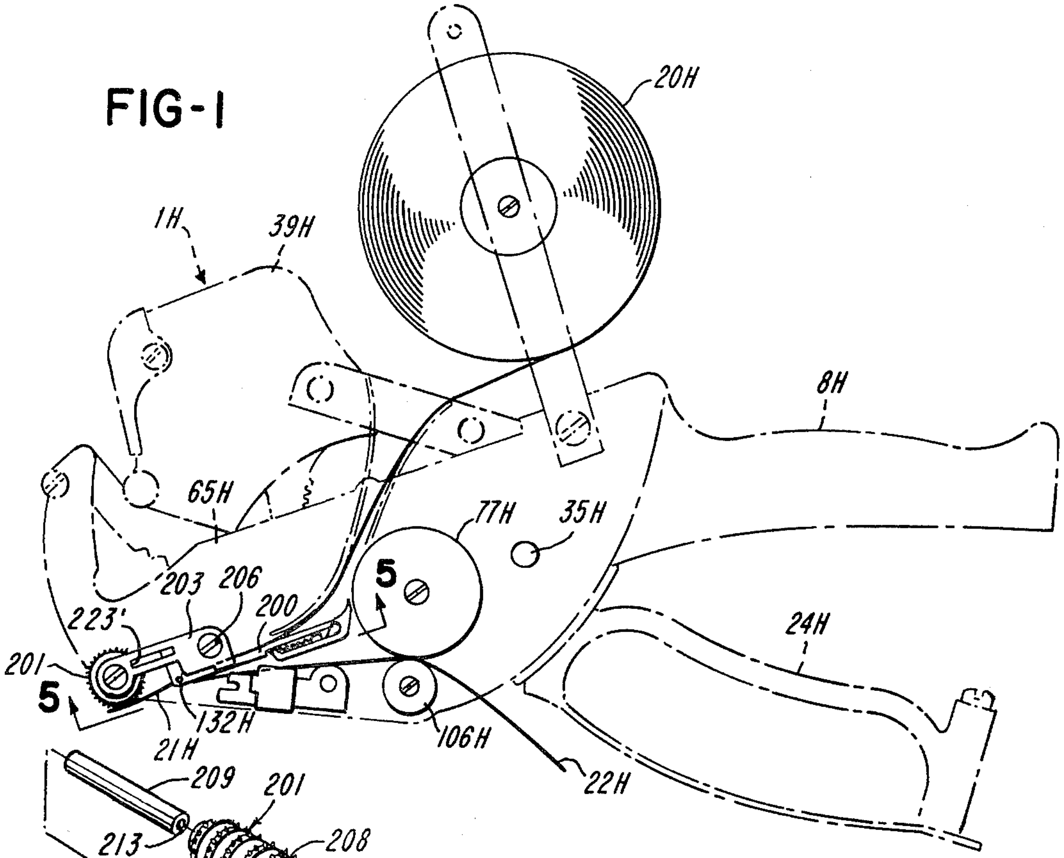
FIG. 1 is a side elevational view of label printing and applying apparatus, shown partly by phantom lines.

With reference to FIG. 1, there is shown, mainly by phantom lines, a label printing and applying apparatus generally indicated at 1H. The apparatus 1H is the same as the apparatus disclosed in U.S. Pat. No. 3,440,123 of Paul H. Hamisch, Sr. in construction, function, and relative location of components, except as will hereinafter be described; reference can be made to this patent, the disclosure of which is incorporated herein by reference. The reference characters in the present application which are common to the reference characters in U.S. Pat. No. 3,440,123 include a suffix H.

Figure 3:
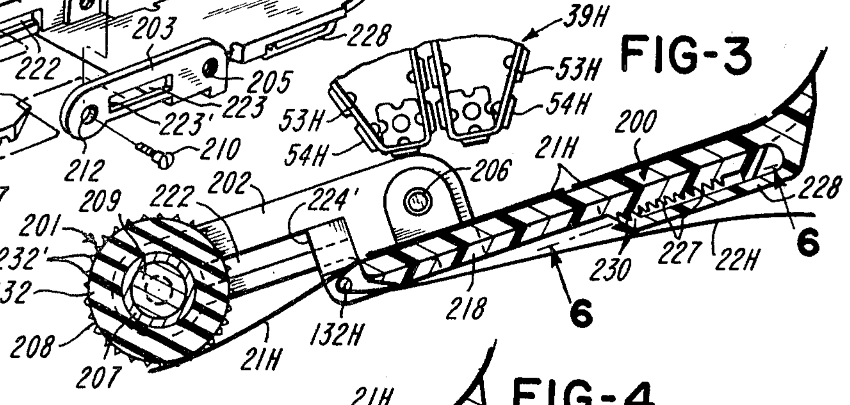
FIG. 3 is a sectional side elevational view through the mounting arrangement showing the delaminator in one position relative to the applicator and to the platen.
Figure 4:
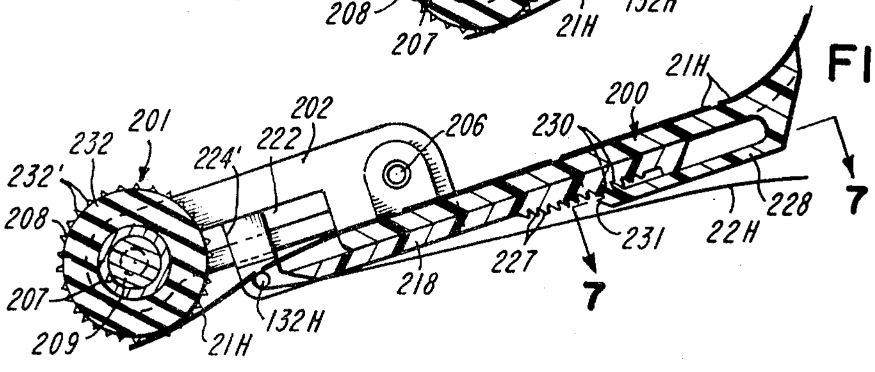
FIG. 4 is a view similar to FIG. 3, but showing the applicator and the delaminator in another position relative to the applicator and the platen.

The apparatus 1H uses a roll 20H which comprises pressure sensitive labels 21H carried by a web in the form of a backing strip or supporting material 22H. The apparatus 1H is adapted to be held in the user's hand. The handle 8H is held against the user's palm and can be squeezed to cause the lever 24H to move toward the handle 8H. The lever 24H is pivotally mounted on a pivot 35H. As the lever 24H is squeezed, print head 39H is moved toward a platen 200. As the manual squeezing force on the lever 24H is released, the print head 39H returns to its initial position shown in FIG. 1 and the web of supporting material 22H is advanced by the action of a drive wheel 77H in cooperation with an idler wheel 106H. The drive wheel 77H rotates counterclockwise (FIG. 1) and the web 22H is advanced by a distance equal to the length of one of the labels 21H; and consequently the leading marginal end of the advanced label is brought into underlying relationship relative to an applicator or pressure means 201. The leading label 21H is now substantially entirely delaminated from the web by a delaminator 132H shown to be in the form of a very small diameter roller; the trailing marginal edge of the leading label remains adhered to the web of supporting material 22H. As the label 21H is relative stiff, it does not follow the supporting material but rather extends as shown in FIGS. 1, 3 and 4. When the leading label 21H is ready to be applied, the applicator 201 is used to exert light pressure against the label to facilitate adherence of the label to the surface.

Figure 2:
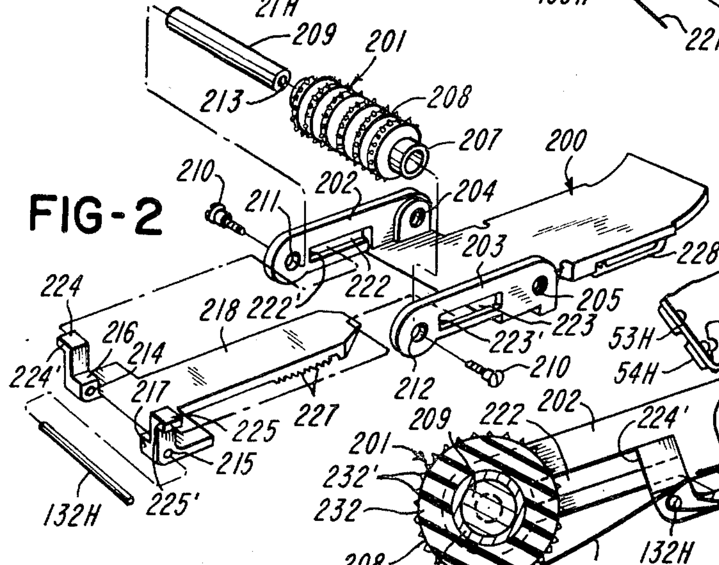
FIG. 2 is an exploded perspective view of an improved arrangement for mounting an applicator, a delaminator, and a platen in accordance with the invention.
Figure 5:
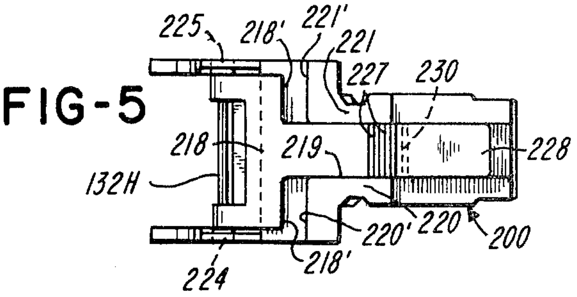
FIG. 5 is a bottom plan view taken generally along the line 5—5 of FIG. 1, but on a larger scale.

With reference to FIGS. 2 and 5, the platen 200 is mounted by the apparatus 1H in the same position as the platen 171 in U.S. Pat. No. 3,440,123. The print head 39H is shown to include two sets of printing bands 53H. Each printing band 53H has a plurality of printing members or blocks 54H for printing selected data. The printing bands 53H are settable so that selected data are printed on labels which are successively presented between the print head 39H and the platen 200. A pair of parallel spaced-apart arms 202 and 203 are connected to side edges of the platen 200. The arms 202 and 203 have threaded holes 204 and 205. Screws 206, threadably received in holes 204 and 205, secure the arms 202 and 203 to the side plates 65H and 66H.

The applicator 201 is preferably of the roll-type, although other forms of applicators such as of the presser foot type can be used. The applicator 201 comprises a hub 207 which is shown to be tubular in construction. A bearing or shaft 209 extends through the hub 207. Screws 210 extend through holes 211 and 212 in respective arms 202 and 203 and are threadably received in threaded holes 213 at the ends of the bearing 209. The applicator 201 is freely rotatable about the bearing 209.

The delaminator 132H is shown to comprise a circular cylindrical rod or roller which is rotatably mounted at its marginal ends in holes 214 and 215 in spaced-apart bearings 216 and 217. The delmainator can instead take the form of a stripper bar, peel edge or the like, if desired. The bearings 216 and 217 are joined integrally to one end of a generally T-shaped plate 218. The plate 218 is shown to be received in a guide groove 219 formed on the underside of the platen 200 by projections 220 and 221.

The arms 202 and 203 are provided respectively with guide tracks 222 and 223. A pair of outwardly extending guided members or projections 224 and 225, joined to the end of the plate 218, are received by the respective guide tracks 222 and 223. The arms 202 and 203 (or at least one of them) are sufficiently flexible and resilient to be apread apart during assembly to enable the guided members 224 and 225 to enter the guide tracks 222 and 223. The arms 202 and 203 are sufficiently flexible and resilient to be spread apart during assembly to enable the guided members 224 and 225 to enter the guide tracks 222 and 223.

Figure 6:
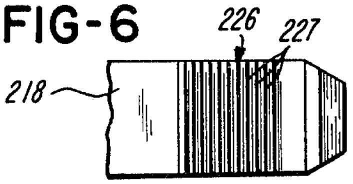
FIG. 6 is a sectional view taken along lines 6—6 of FIG. 3.
Figure 7:
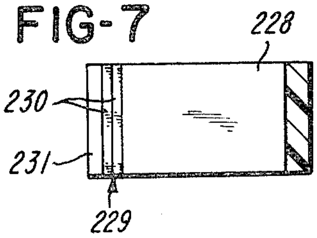
FIG. 7 is a sectional view taken along line 7—7 of FIG. 4.

As best shown in FIG. 6, the underside of the end portion of the plate 218 comprises a toothed member 226 having a plurality of closely spaced-apart parallel teeth. A flexible resilient member or arm 228 is integrally joined to one end of the platen 200. The arm 228 mounts a toothed member 229 at its free end. The toothed member 229 comprises preferably two parallel closely spaced-apart teeth 230 having the same pitch as the teeth 227 of the toothed member 226. The end of the member 228 is provided with an extension 231 which is engageable by the user's fingernail to flex the arm 228 so that its teeth 230 can be moved to a position clear of the teeth 227. As soon as the projection 231 is released, the arm 228 returns to its normal position as shown, for example, in FIG. 3. The flexible resilient arm 228 also holds the plate 218 against the underside of the platen 200.

In use, the positional relationship of the delaminator 132H relative to the applicator 201 and also relative to the platen 200 can be quickly and easily varied. Such a change of the positional relationship of the delaminator 132H is desirable, for example, if the apparatus 1H is to print and apply different length labels. A change of the positional relationship of the delaminator 132H is also desirable in the event it is also desired to change the width of the trailing marginal end of the label which is still adhered to the supporting material 22H upon completion of the label feeding movement of the apparatus 1H.

Assume that the delaminator 132H is to be moved from the position shown in FIG. 3 to the position shown in FIG. 4. As the teeth 227 formed on the plate 128 slope to the right (FIGS. 3 and 4) and as the teeth 230 formed on the arm 228 slope to the left (FIGS. 3 and 4), the delaminator 132H and the plate 218 can be shifted generally to the left as viewed in FIG. 4 by engaging a fingernail with the delaminator 132H and by urging the delaminator 132H generally to the left. This will cause the teeth 227 to ride over the teeth 230. Once the delaminator 132H and its associated plate 218 have reached the position shown in FIG. 4, they are locked in position by the teeth 227 and 230 of respective locking members 226 and 229. As the supporting material 22H is drawn around the delaminator 132H during rotation of wheels 77H and 106H, cooperating teeth 227 and 230 prevent the delaminator 232H and its plate 218 from shifting (generally to the right as viewed in FIG. 4) out of the selected position. Assuming now that it is desired to shift the delaminator 132H and its associated plate 218 from the position shown in FIG. 4 to the position shown in FIG. 3, the user engages his fingernail with the extension 231 and the arm 228 is caused to be flexed so that the teeth 230 clear the teeth 227. Then by pushing the delaminator 132H generally to the right from the portion shown in FIG. 3 to the position shown in FIG. 4, the delaminator 132H is brought to the selected positional relationship with respect to the applicator 201 and the platen 200. Thereupon, the extension 231 can be released, and the arm 228 deflects resiliently to again bring the teeth 230 into locking engagement with the teeth 227.

With reference to FIG. 5, the plate 218 is shown to have stop faces 218' which abut the stop faces 220' and 221' when the plate 218 is in the fully rearward position shown in FIG. 3; in this position the two teeth 230 are engaged with the two endmost teeth at one end of the toothed member 226. In the fully forward position, stop faces 224' and 225' of respective projections 224 and 225 abut ends 222' and 223' of respective tracks 222 and 223, so that the other two endmost teeth of the other end of the toothed member 226 can be engaged. It is preferred that the teeth 227 and 230 be small and that two teeth 230 are always in engagement with two teeth 227 during use of the apparatus 1H. In one specific embodiment the teeth 227 and 228 have a pitch of about thirty-six teeth per inch.

The platen 200, the mounting arms 202 and 203, and the arm 228 are molded of one piece of plastic material and likewise the plate 218, the bearings 216 and 217, and the guided members 224 and 225 which are joined integrally to the plate 218 are molded of one piece of plastic material. It is apparent that there is provided an assembly which provides a platen and mounting structure for an applicator and a delaminator which is relatively economical to manufacture and easy to assemble and adjust.

Figure 8:
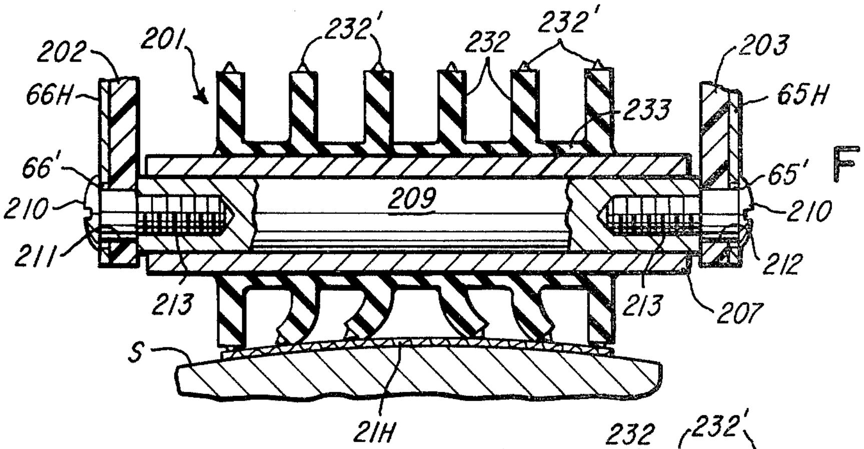
FIG. 8 is an enlarged sectional view of the applicator shown in FIGS. 1 through 5 showing a label being adhered to a convex surface.
Figure 9:
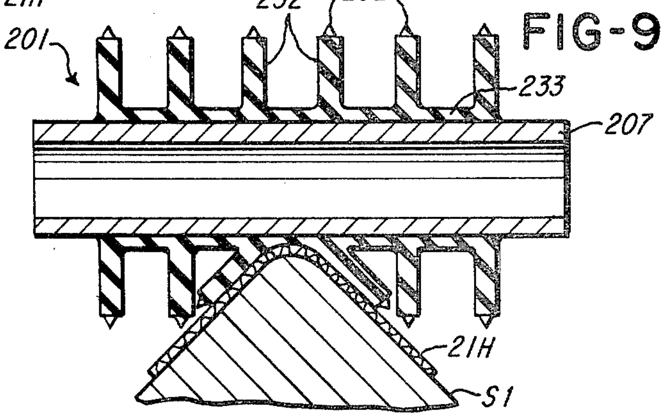
FIG. 9 is a sectional view similar to FIG. 8, but omitting the bearing and the other mounting structure, showing a label being applied to a corner of an object.

With reference to FIG. 8, the one-piece roll 208 of the applicator 201 is shown to comprise spaced-apart, parallel, flexible, resilient, annular discs or disc portions 232. The discs or disc portions 232 are joined at their roots by a hub portion 233. Each disc 232 is provided at its periphery with small projections 232' which provide only a small area of contact between the applicator 201 and the label 21H. The roll 208 is illustrated as being molded directly onto the hub 207. By way of specific example, not limitation, the bearing 209 is composed of steel, the hub 207 can be constructed of material such as brass and the roll 208 is composed of a frictional material such as rubber or polyurethane which adheres well to brass. Accordingly, no auxiliary adhesives or other keying means is required to secure the roll 208 to the hub 207. The bearing or shaft 209 is shown to rotatably mount the hub 207. The screws 210 are shown to extend through holes 65' and 66' in parallel structural side pflates 65H and 66H and through holes 211 and 212 in respective arms 202 and 203 and are threadably received in threaded bores 213 in the bearing 209. As shown in FIG. 8, the discs 232 readily flex to allow the label 21H to be pressed against a convex surface S. With reference to FIG. 9, the applicator 201 is shown to be applying a label 21H to a corner of a surface S1.

With reference to the embodiment of FIGS. 10 through 11, an applicator generally indicated at 235 is shown to comprise a roll 236 and a deflectable member 239. The roll 236 comprises spaced-apart, parallel, flexible, resilient, annular discs or disc portions 237 joined to a hub portion 238. Each disc 237 is provided at its periphery with small projections 237' which provided only a small area of contact between the applicator 235 and the label 21H. The deflectable member 239, which is shown to comprise a helical spring 239', serves as a hub for the roll 236. The applicator 235 can be formed by placing the spring which comprises the deflectable member 239 onto a mandrel (not shown) and thereafter molding flexible resilient moldable material about the spring 239' and into the space between its coils as best shown in FIG. 10. A pair of opposed bearings 240 and 241 are shown to be radiused as indicated at 242 and 243 so that, as is preferred, the entire length of the roll 235 can deflect so as to facilitate application of a label 21H to an irregular surface.

With reference to the embodiment of FIG. 12, there is illustrated an applicator generally indicated at 244 which is identical to the applicator 235, except that its roll 247 is first molded and thereafter a deflectable member 245, in the form of a helical spring 245', is inserted into the axial hole 246 in the roll 247. Accordingly, in this embodiment there is no material between the coils of the spring 245' as in the embodiment of FIGS. 10 and 11.

Referring to the embodiment of FIGS. 13 and 14, an applicator 250 is shown to comprise a hub or hub portion 251 having a plurality of spaced-apart, parallel, flexible, resilient, annular discs or disc portions 252. Each disc portion 252 is provided at its periphery with a plurality of small projections 252'. The roll 251 is of one-piece molded construction. Bearings 254 and 255, shown to have a cup-shaped construction, are mounted by opposed marginal ends of the hub portion 251. The bearings 254 and 255 are received in respective annular recesses 256 and 257 which are coaxial with respect to the hub portion 251. Bearing screws 258 and 259 are threadably received by threaded holes 211' and 212' in mounting arms 202 and 203. Annular stub ends 260 and 261 of the bearing screws 258 and 259 are received in the bearings 254 and 255. The applicator 250 is freely rotatable about stub ends 260 and 261 and yet is flexible and resilient enough to conform to irregularities on the surface to which the label is applied. Not only are the discs 252 capable of flexing independently, but the hub 251 itself is a deflectable member which can deflect while the label is being applied to the irregular surface. If desired, the hub portion 251 can be cored out by, for example, an axial hole extending from end to end so as to both save material and to render the hub portion 251 more flexible.

It is apparent that the applicators 201, 235, 244 and 250 are also deflectable to conform to concave and warped surfaces in addition to convex surfaces. The rolls 208, 236, 247, and 251 of respective applicators 201, 235, 244 and 250 are composed of material such as polyurethane or rubber having a relatively high coefficient of friction to enable the applicators to rotate as the label is being applied.

Other embodiments and modifications of this invention will suggest themselves to those skilled in the art, and all such of these as come within the spirit of this invention are included within its scope as best defined by the appended claims.

I claim:

1. Label applying apparatus comprising: an applicator, and means for dispensing labels successively in label applying relationship with respect to the applicator, the applicator comprising a deflectable member and a deflectable roll mounted on and encircling the deflectable member, wherein the deflectable member comprises a helical spring.

2. Label applying apparatus, comprising: an applicator roll having an axis of rotation, and means for dispensing labels successively in label applying relationship with respect to the applicator roll, substantially the entire applicator roll being deflectable along its axis of rotation to conform to irregular surfaces as a label is being applied, the applicator roll comprising a resilient deflectable rotatably mounted member and a resilient deflectable roll mounted on and encircling the deflectable member.

3. Label applying apparatus, comprising: an applicator having an axis of rotation, and means for dispensing labels successively in label applying relationship with respect to the applicator, the applicator comprising a resilient deflectable member and a resilient deflectable roll mounted on and encircling the deflectable member, the roll having an axis of rotation, wherein the deflectable member comprises a helical spring, the spring and the roll being deflectable relative to the axis of rotation.

4. Label applying apparatus, comprising: an applicator roll having an axis of rotation, and means for dispensing labels successively in label applying relationship with respect to the applicator roll, substantially the entire applicator roll being deflectable along its axis of rotation to conform to irregular surfaces as a label is being applied, the applicator roll comprising a resilient deflectable rotatably mounted member and a resilient deflectable roll mounted on and encircling the deflectable member, wherein the roll includes a plurality of annular discs, the discs being independently yieldable.

5. Label applying apparatus, comprising: an applicator roll having an axis of rotation, and means for dispensing labels successively in label applying relationship with respect to the applicator roll, substantially the entire applicator roll being deflectable along its axis of rotation to conform to irregular surfaces as a label is being applied, the applicator roll comprising a resilient deflectable rotatably mounted member and a resilient deflectable roll mounted on and encircling the deflectable member, and opposed bearings disposed at the ends of the deflectable member for rotatably mounting the applicator roll.

6. Label applying apparatus, comprising: an applicator, and means for dispensing labels successively in label applying relationship with respect to the applicator, the applicator comprising a resilient deflectable member and a resilient deflectable roll mounted on and encircling the deflectable member, the roll having an axis of rotation, wherein the deflectable member includes a helical spring, the roll and the spring being deflectable relative to the axis of rotation, and wherein the roll comprises a plurality of annular discs, the discs being independently yieldable.

7. Label applying apparatus, comprising: an applicator, and means for dispensing labels in label applying relationship with respect to the applicator; the applicator comprising a deflectable generally tubular roll composed of flexible resilient material and having an axis of rotation, and means disposed at the end portions of the roll for mounting the roll to the dispensing means so that at least the portion of the roll between the end portions can deflect along its axis of rotation to conform to irregular surfaces as the label is being applied, wherein the mounting means comprises a pair of stationary members received in the end portions of the roll, each member having a tapered portion, the tapering portions being normally spaced from the inside of the roll by a clearance space to facilitate deflection of the roll.

8. Label applying apparatus, comprising: an applicator, and means for dispensing labels in label applying relationship with respect to the applicator; the applicator having an axis of rotation and comprising a helical spring and a deflectable generally tubular roll composed of flexible resilient material and disposed about the helical spring, and means for rotatably mounting the applicator to the dispensing means so that at least the portion of the applicator between the end portions can deflect along its axis of rotation to conform to irregular surfaces as the label is being applied, the mounting means including a pair of bearings secured to the dispensing means and received in respective end portions of the roll, the applicator being mounted for rotation about the bearings.

* * * * *